United States Patent [19]
Hungate et al.

[11] 3,726,062
[45] Apr. 10, 1973

[54] METHOD OF CONTROLLING THE EMISSION OF ODORS AND PARTICULATE MATTER

[75] Inventors: Ernest C. Hungate; Harold A. Ogletree; Grason T. Nickell, all of Greensboro, N.C.

[73] Assignee: Air Conditioning Corporation, Greensboro, N.C.

[22] Filed: Dec. 31, 1970

[21] Appl. No.: 103,039

[52] U.S. Cl. ...........................55/89, 55/90, 55/94
[51] Int. Cl. ...............................................B01d 47/06
[58] Field of Search......................55/89, 90, 93, 94, 55/257, 440

[56] References Cited

UNITED STATES PATENTS

| | | | |
|---|---|---|---|
| 3,338,029 | 8/1967 | Warfield, Jr. | 55/94 X |
| 3,439,475 | 4/1969 | Austin et al. | 55/94 X |
| 3,370,402 | 2/1968 | Nakai et al. | 55/94 |
| 3,444,670 | 5/1969 | Hungate | 55/257 |
| 3,527,030 | 9/1970 | Hungate | 55/440 |

*Primary Examiner*—John Adee
*Attorney*—Lane, Aitken, Dunner & Ziems

[57] ABSTRACT

A method of controlling the emission of odors and particulate matter, for example, from a rendering and meat packing plant. The method comprises the steps of providing a source of gas, for example air, containing an undesirable level of odor and particulate matter, causing the gas to pass through a chamber containing a densely sprayed chemical solution which contacts the gas at a high contact efficiency between the gas and the liquid to collect and suspend particulate matter in the solution and absorb odors, and causing the gas again to be placed into forced intimate contact with the solution while simultaneously separating the chemical solution from the cleansed gas. The method may also include the step of creating a uniform gas velocity prior to treatment, and, in an alternate embodiment, the gas may be subjected to a plurality of spraying treatments with the same or different solutions. The solutions may be acidic, basic, masking, oxiodizing, neutralizing, or reacting. Specific solutions disclosed include solutions of water with sodium bicarbonate, sodium bisulfite, sodium hydroxide, chlorine dioxide, potassium permanganate, and calcium hypochlorite. Chlorine gas may also be introduced into the air stream for the same purpose.

11 Claims, 4 Drawing Figures

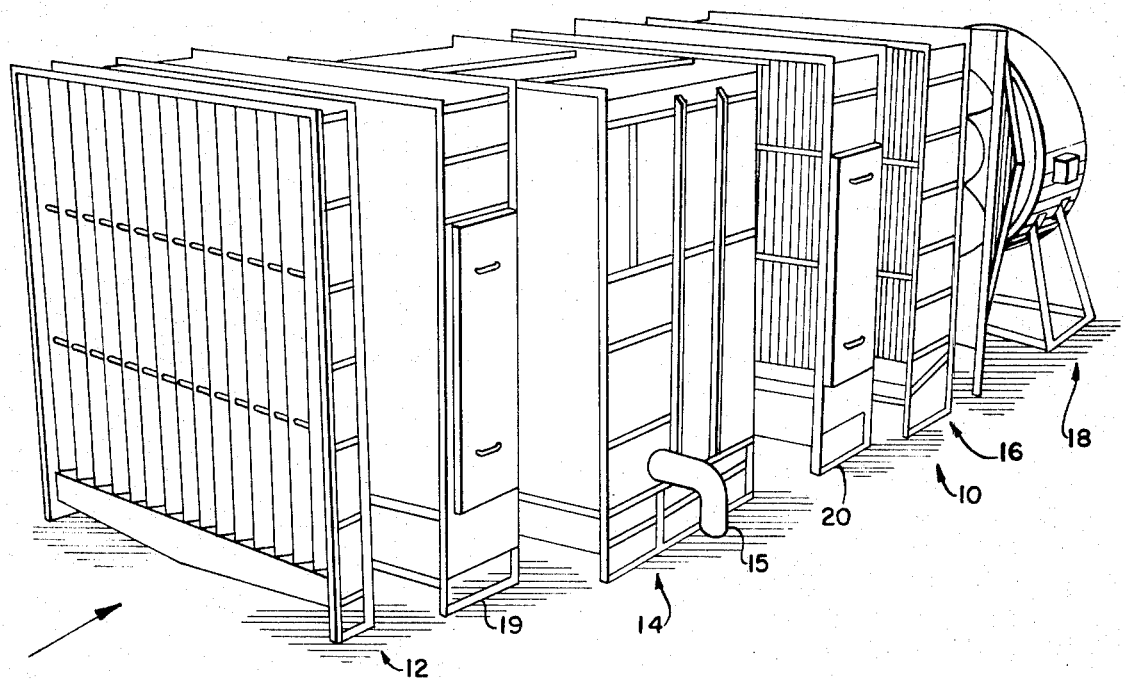

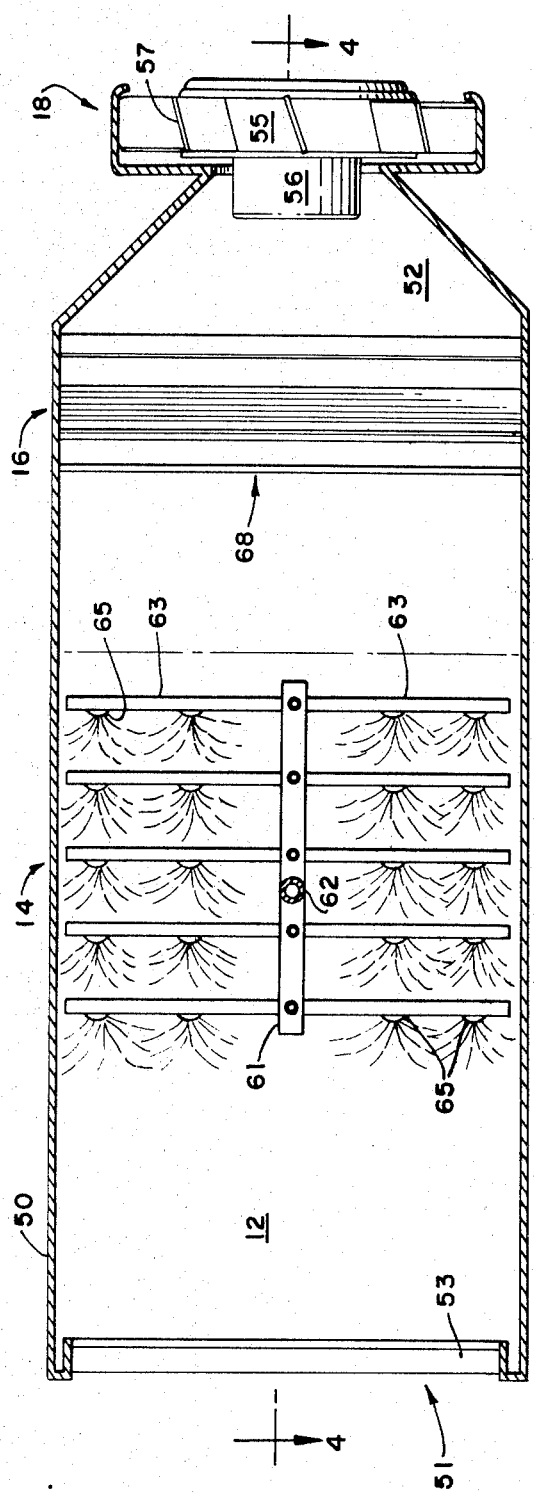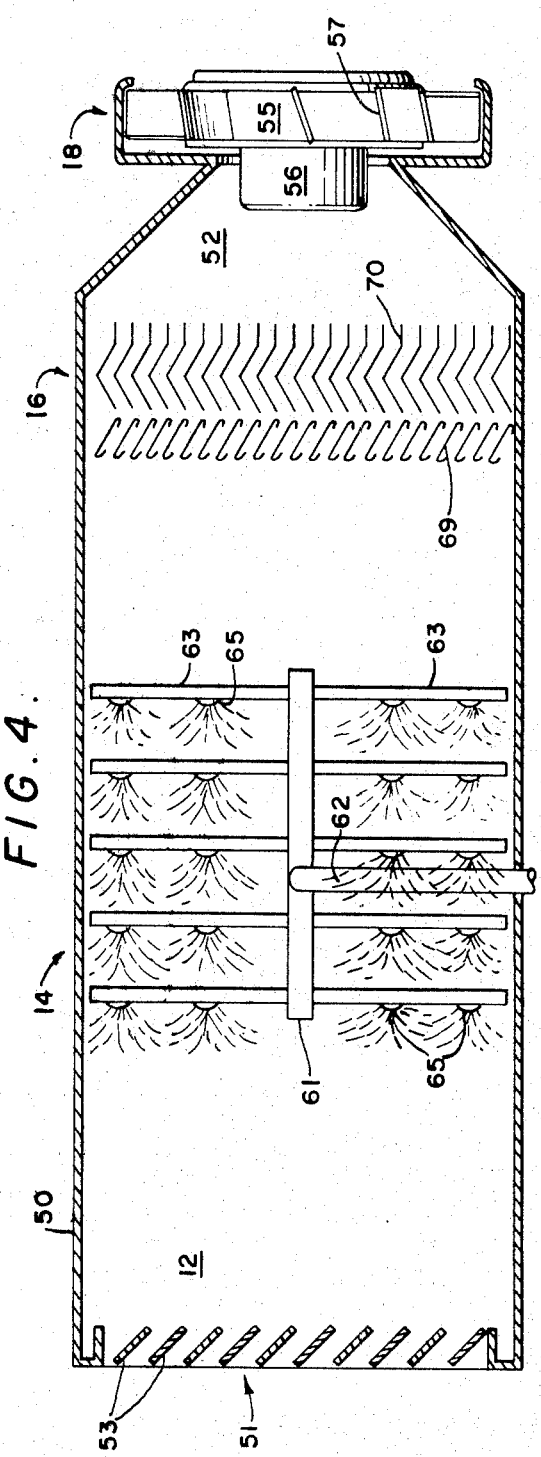

METHOD OF CONTROLLING THE EMISSION OF ODORS AND PARTICULATE MATTER

BACKGROUND OF THE INVENTION

This invention relates to a method of odor and particulate abatement. More particularly, this invention relates to a method of controlling the emission of odors and particulate matter, for example, from a rendering and meat packing plant. Still more particularly, this invention relates to a method of cleansing a gas and removing particulate matter therefrom by causing the gas to pass through a spray chamber containing a densely sprayed chemical solution and thereafter causing the discharge gas stream to be placed into forced intimate contact with the solution while simultaneously separating the chemical solution from the gas to be discharged from the apparatus.

It has long been a problem in the art to provide methods and apparatuses for treating gas streams to remove odor and particulate matter therefrom. While such systems are generally used in plant ventilation and exhaust systems, their use becomes particularly appropriate in certain environments, for example, the rendering and meat packing industries. The need for highly efficient, low cost, high capacity, and lightweight systems which require a minimum of maintenance has become particularly acute in view of the public interest in avoiding and minimizing air pollution.

The prior art has produced a number of devices of the type described which have been designed to clean air. One such device is generally referred to in the art as a low velocity scrubber which causes the effluent to pass through a tower-like structure containing materials intended to cause the removal of odor and particulate matter from the gas. While effective for some uses, one of the difficulties with such scrubbers is that they are inherently low velocity devices and are generally not self-cleaning. Thus, the effluent either has to be discharged into the atmosphere during the time that the tower is being cleaned or standby towers must be constructed, both of which approaches are largely unsatisfactory because of the ineffectiveness of the solution to the problem or the cost involved.

The prior art has also produced a number of air conditioning devices such as air washers which are generally intended for industrial applications. However, in the main, such devices have been severely restricted in their operating velocities for a number of reasons, but particularly due to the configuration of the eliminating structures in these devices. A system and apparatus which permits the high velocity treatment of air is described in the U.S. Pats. to Ernest C. Hungate, No. 3,444,670, issued May 20, 1969 and No. 3,527,030 issued Sept. 8, 1970, the disclosures of which are hereby incorporated by reference. These patents describe a number of advantages in using such structures in air washing systems. Thus, it is an overall aim of this invention to provide a method of using high velocity structures of the type described for the treatment of gases to remove odor and particulate matter therefrom.

The prior art has also developed a number of systems for treating air for a wide variety of purposes, including odor and particulate removal, which generally include as an essential step thereof, the treatment of the air with a spray of liquid. It is, however, a problem in the art of such devices to improve their contact efficiency and their effectiveness in achieving the desired purpose. Thus, it is a problem in the art to improve upon the efficiency of devices which utilize sprayed liquid solutions for contacting gases to effect odor and particulate removal therefrom. To this end, the art has also developed a number of specific chemical solutions for both general and specific application for odor and particulate abatement. In this respect, it is a continuing problem in the art to develop chemical solutions and to determine their effective strengths for use in such spraying systems which are particularly effective in removing odor and particulate matter from the liquid passing therethrough.

In addition, when using highly efficient contact sprays to treat a gas, it is a continuing problem to develop efficient eliminator structures which will effectively eliminate the contacted chemical solution from the gas. It is a further aim of this invention to provide a method of odor abatement and particulate removal which provides an additional contact treatment of the gas with the chemical solution during the elimination step, particularly in high velocity systems.

Accordingly, it is an object of this invention to provide a novel and unobvious method of utilizing an air conditioning apparatus for use in removing odor and particulate matter from a gas.

It is another object of this invention to provide a high velocity air conditioning apparatus which subjects the incoming air to plural treatments to remove odor and particulate matter therefrom.

It is an additional object of this invention to provide a highly effective, low cost, high velocity air conditioning system which causes the air to intimately contact one or more chemical solutions as the first step in odor and particulate removal therefrom.

It is a more general object of this invention to provide a method of cleansing gases in which chemical solutions are provided for contacting gas in systems of the type described.

It is an additional object of this invention to provide a method of removing odor and particulate matter from a gas by causing the gas to contact intimately a densely-sprayed chemical solution, and thereafter to cause the gas to contact the chemical solution while the solution is being removed from the gas.

These and other objects of the invention will become apparent from a review of the accompanying written description of the invention taken in conjunction with the accompanying drawings.

BRIEF SUMMARY OF THE INVENTION

Directed to achieving the aforestated objects and to overcoming the problems of the prior art, this invention relates to a method of removing odor and particulate matter from a gas wherein the gas is subjected to at least two treatment steps. The gas is first caused to pass at a relatively high velocity through a chamber containing a densely-sprayed chemical solution which is designed to produce a very high contact efficiency between the gas and the liquid. In this chamber, a large portion of the particulate matter is collected and suspended in the solution and a high proportion of the odors are absorbed. In one embodiment, 965 gal./min. of solution are used in 100,000 ft$^3$/min. apparatus so that the density of solution in the spray chamber is about $9.65 \times 10^{-3}$ gal./ft.$^3$ of gas flow. The gas is subjected to a second cleansing and odor reduction step wherein the gaseous discharge stream from the spray chamber is caused to be again intimately contacted with the solution while simultaneously separating the chemical solution from the gas to be discharged from the equipment.

In alternate embodiments, the gas is subjected to an initial step which causes the gas to achieve an approximately uniform velocity for entry into the spray chamber to undergo the initial contacting step. In addition, the gas may be subjected to treatment by multiple spray solutions, either of the same or different solutions. The spray solutions sprayed into the air stream through the banks of sprays in the apparatus may be acidic, masking, basic, oxidizing, neutralizing, or reacting solutions. In a preferred embodiment, the solutions comprise, in combination with water, a chemical selected from the group consisting of sodium bicarbonate, sodium bisulfite, sodium hydroxide, chlorine dioxide, potassium permanganate or calcium hypochlorite. Preferably the strength of each of the solutions of sodium bisulfite and sodium hydroxide is about 0.5 to about 1.5 percent by weight, while the preferred strength of the chlorine dioxide solution is about 0.05 to about 0.1 percent by weight, the strength of the potassium permanganate solution is about 0.5 percent; and the strength of the calcium hypochlorite solution is about 0.1 to about 0.3 percent; Moreover, the pH of the preferred solution of sodium hydroxide is about 11.5, while the pH of the preferred solution of sodium bisulfite is about 4.5. The chlorine gas may be introduced at a strength of about 20–60 PPM.

The velocity of the gas which is operative for practicing the method of the invention is in the range of about 600 ft./min. to about 3,000 ft/min. The optimum range of gas velocity for practicing the method of the invention is in the range of about 1,000 ft./min. to about 3,000 ft./min.. In addition, the units for practicing the invention have ranged in size from about 38,000 ft.$^3$/min. to about 150,000 ft.$^3$/min.

In the drawings:

FIG. 1 is a perspective view of the components of the apparatus for practicing the method according to the invention;

FIG. 2 is a block diagram of the essential components of the apparatus for practicing the method according to the invention wherein the gas may be subjected to a second spray treatment with the same or a separate solution;

FIG. 3 is an elevational view, partially in section, of an embodiment of an apparatus suitable for practicing the invention; and FIG. 4 is a plan view, partially in section, of the apparatus shown in FIG. 3.

DETAILED DESCRIPTION OF THE PREFERRED EMBODIMENTS

In FIG. 1, an apparatus, designated generally by the reference numeral 10, suitable for practicing the method according to the invention, includes diffusion means, designated generally by the numeral 12, for causing the gas entering into the apparatus to achieve a uniform velocity and air flow uniformity. The gas provided to the input may be obtained from an industrial plant, for example, from exhaust hoods associated with equipment within the plant. Typically, such gas contains an undesirable level of odor, pollutants, contaminants, dispersants, colloidal suspensions and particulate matter, the emission of which is desired to be eliminated, or at least controlled to a tolerable level.

A spray chamber means, designated generally by the reference numeral 14, are provided for subjecting the air to and causing it to contact a densely-sprayed chemical solution in such a manner that a high contact efficiency between the gas and the liquid is achieved. The aqueous chemical solution is provided to the spray chamber through suitable piping shown at 15, and contacts the gas in a manner and at a density to be discussed in greater detail. In the spray chamber means 14, a high proportion of the particulate matter in the noxious gas is collected and suspended in the aqueous chemical solution and a large proportion of the odors are absorbed therein. Thereafter, the gas is subjected to a second cleansing and further odor reduction in the second contact and elimination means designated generally by the reference number 16. In the second contact and elimination means 16, the gas is caused again to contact the chemical solution to achieve a higher level of particulate removal and odor reduction while simultaneously the aqueous chemical solution is removed therefrom. The manner by which this effect is achieved is described in greater detail in connection with a specific embodiment.

Gas moving means, designated generally by the reference numeral 18 are provided for causing the gas to pass through the system. Access chambers 19 and 20 are provided to permit access of operating and maintenance personnel to the system. Such systems, as may be understood, may be mounted at ground level or on the roofs of the plants producing the gases desired to be cleansed.

FIG. 2 shows a block diagram of the components of the apparatus for practicing the method according to the invention, wherein the gas may be subjected to a contact treatment with a second chemical solution. An input source of gas containing an offensive degree of odor and unacceptable level of particulate matter, such as from a rendering and meat packing plant, is designated by the reference numeral 22. The gas therefrom is passed through entrance diffusion baffles 12, which correspond to the gas diffusion means 12 shown and described in connection with FIG. 1. The gas then passes to the spray chamber 14 in the manner described in connection with FIG. 1 and to the final contact and elimination section 16. Where desired, the gas from the eliminator section 16 may be further subjected to the second spray chamber 26, which may contain the same or a different solution as that used in the spray chamber 14. The output from the spray chamber 26 passes to a second contact and elimination section 28 to provide the output designated by the reference numeral 30 from the system.

The chemical solution is provided to the spray chamber from a solution supply source, designated generally by reference numeral 29 comprising a recirculation chamber 31, from which liquid is pumped by pump 32 to the spray chamber 14. Means are provided, designated generally by the reference numeral 33, for sensing the concentration of the solution in the recirculation chamber 31 by a known manner, for example, by sensing the pH of the solution to cause the admission of a concentrated solution of slurry into the recirculation chamber 31 from a slurry tank 34. Thus, the concentration of the aqueous chemical solution may be controlled within relatively precise limits.

A second source of chemical solution, designated by the reference numeral 36, for use in the spray chamber 26 operates in the same manner as described in connection with the supply source 29, and for the embodiment shown, it has been assumed that different chemical solutions are used. Where it is desired to have the air contacted twice by the same chemical solution, both the spray chamber 14 and the spray chamber 26 may be supplied from a common source.

Particulate matter which has become suspended in the spray solution may be removed periodically by draining the entire solution from the recirculation chambers 31 and replenishing each chamber with a new solution. The solution which is provided to the spray chamber 14 or to the spray chamber 26 is provided under a pressure of about 10–40 psig and preferably at about 30 psig from pump 32. The solution may be returned to the recirculation chamber 31 by gravity or pumped from the spray chamber. The details of a manner by which chemical solution is supplied to the spray chambers and returned therefrom may be developed in accordance with the needs of a particular system.

The chemical solutions for practicing the method may be acidic, basic, masking, oxidizing, neutralizing or reacting solutions. By way of specific example, aqueous solutions of sodium bicarbonate, sodium bisulfite, sodium hydroxide, chlorine dioxide, or potassium permanganate are practicable for practicing the invention. Optimum results have been obtained with aqueous solutions of sodium hydroxide at a concentration in water of about 0.5 to about 1.5 percent by weight at a pH of about 11.5. The optimum concentration of sodium bisulfite has also been found to be about 0.5 to about 1.5 percent by weight at a pH of about 4.5. The optimum concentration of chlorine dioxide in water has been found to be about 0.05 to about 0.1 percent by weight while a solution of potassium permanganate in water having a strength of about 0.5 percent by weight has performed satisfactorily.

The density of sprayed solution in the spray chamber in a specific embodiment was determined from the fact that about 965 gal./min. of chemical solution were used with a 100,000 ft$^3$/min. throughput, thus providing a spray density of about $9.65 \times 10^{-3}$ gal./ft.$^3$. This density has been found to be satisfactory for throughputs ranging from about 38,000 ft.$^3$/min. at least to about 150,000 ft.$^3$/min.

The system has operated satisfactorily at a gas velocity in the range of about 600 ft./min. to about 3,000 ft./min., wherein optimum results were obtained in the range of about 1,000 ft./min to about 3,000 ft./min.

FIGS. 3 and 4 illustrate one embodiment of an apparatus suitable for use in practicing the method according to the invention. Portions of such apparatus are described in greater detail in the U.S. Pat. to Ernest C. Hungate, No. 3,444,670, issued May 20, 1969, mentioned above. As may be seen in FIGS. 3 and 4 the apparatus includes a housing 50 having an inlet 51 and an outlet 52.

The entrance diffusion baffles are designated generally by the numerals 53 and may be either individually or collectively arranged to subject the gas to create uniform gas flow for entrance into the spray chamber 14.

The gas moving means 18 are preferably located downstream from the apparatus so that the cleansed air, rather than the effluent, contacts the fan 55. The fan 55 is driven by a fan motor 56 and may include a plurality of radially extending blades 57 to draw the desired quantity of gas through the apparatus.

The spray chamber 14 is located downstream from the entrance diffusion baffles 12 and, in the preferred embodiment, includes an axially extending header 61 connected by means of a supply line 62 to a source of chemical solution. A plurality of radial arms 63 extend from the header 61 having suitable spray nozzles 65 at the ends and positions intermediate the ends thereof whose function is to spray liquified particles of the aqueous chemical solution into the gas stream to treat the gas with the chemical solution to remove odor and particulate matter therefrom in accordance with the teachings of this invention.

An eliminator structure 68 is located on the downstream side of the spray chamber 14. The eliminator, by way of example, comprises two sets of substantially vertically extending blades 69 and 70. The blades 69 constitute the primary eliminator structure which removes coarse particles from the air stream while downstream therefrom, the blades 70 remove the fine particles in the gas stream.

Thus, with the apparatus described, the gas is caused to pass through the spray chamber 14 and to contact the densely-sprayed chemical solution to produce a high contact efficiency between the gas and the liquid. In this respect, particulate matters are collected and suspended in the solution and odors are absorbed. Final cleansing and further odor reduction takes place in the eliminator section 68 which also places the discharge stream to forced intimate contact with the air to be discharged from the equipment. The intimate contact between the gas and the chemical solution occurs in part because of the high quantities of solution which are being removed from the gas. Thus, an effective wall or curtain of solution is created in the eliminator, through which the oncoming gas must pass, thereby causing further contact with the solution while simultaneously removing solution from the gas.

In the eliminator section, intercepted liquid particles are drained down to the bottom portion of the eliminator located beneath the eliminator blades 69 and 70 to pass through a drain trough which may be returned to the recirculation chamber by gravity as previously described. The details of the eliminator blade structures are described in the Hungate patent referred to immediately above.

Alternate eliminator embodiments, for example, the eliminator structure shown in the Hungate U.S. Pat., No. 3,527,030, may also be used to achieve the purposes of the invention as long as the eliminator causes the gas to contact again the solution as a second phase of the method of the invention. For example, eliminators which provide a tortuous path to the oncoming gas under high velocity conditions to achieve an initially high degree of water removal may also be effective in creating the wall of aqueous solution through which the oncoming gas must pass.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A method for removing odor and particulate matter from a gas in an apparatus for treating a gas stream in a direction having a horizontal component with a liquid comprising a solution, said apparatus being of the type which comprises the combination of means for propelling the gas stream through said apparatus at a high velocity, first means for placing substantial quantities of liquid into intimate contact with the gas stream to condition the gas stream and an eliminator means for removing liquid particles from the gas stream, said method comprising the steps of:

providing a source of gas including at least one of an undesirable level of odor and an undesirable quantity of particulate matter, causing said gas to pass through said apparatus in said direction having said horizontal component at said high velocity in a predetermined range, causing substantial quantities of liquid in the form of a sprayed aqueous solution to contact intimately said gas in said first means so that a high proportion of said particulate matter is collected and suspended in said solution and a high proportion of said odors are initially absorbed therein, and causing substantial quantities of said solution to contact intimately said gas in said eliminator means so that an additional portion of said particulate matter remaining in said gas after treatment in said first means is collected and suspended in solution and an additional portion of remaining odors are also absorbed therein, while simultaneously separating substantially all of said solution from said gas.

2. The method as set forth in claim 1 wherein the step of causing said gas to pass through said apparatus is further characterized in that said velocity is within the range of about 600 ft./min. to about 3,000 ft./min.

3. The method as set forth in claim 2 wherein said velocity is within the range of about 1,000 ft./min. to about 2,400 ft./min.

4. The method as set forth in claim 1 wherein said aqueous solution consists essentially of a solution comprising water and a member selected from the group consisting of sodium bicarbonate, sodium bisulfite, sodium hydroxide, chlorine dioxide, and potassium permanganate.

5. The method as set forth in claim 1 wherein said aqueous solution comprises a solution of water and a member selected from the group consisting of sodium bisulfite, sodium hydroxide, chlorine dioxide, and potassium permanganate, wherein said selected member in said solution is contained in the following range in percent by weight:

| | |
|---|---|
| Sodium bisulfite | 0.5 to 1.5 |
| Sodium hydroxide | 0.5 to 1.5 |
| Chlorine dioxide | 0.05 to 0.1 |
| Potassium permanganate | about 0.5 |

6. The method as set forth in claim 5 wherein said selected solution of the following of said selected members is at the following pH:

| | |
|---|---|
| Sodium bisulfite | 4.5 |
| Sodium hydroxide | 11.5 |

7. The method as set forth in claim 1 wherein the aqueous solution is sprayed in said apparatus at a density of about $9.65 \times 10^{-3}$ gal/ft.$^3$ of gas throughput.

8. The method as set forth in claim 1 wherein said aqueous solution is provided to said apparatus at a pressure in the range of 10–40 psig.

9. The method as set forth in claim 1 wherein the step of causing substantial quantities of said solution to contact intimately said gas in said eliminator means in said apparatus is further characterized in that said gas is caused to pass in contact with an effective curtain of solution produced in said eliminator means during said step of separating.

10. The method as set forth in claim 1 wherein the step of providing is followed by the additional step of causing said gas to achieve a substantially uniform velocity prior to passing through said apparatus.

11. The method as set forth in claim 1 wherein the steps of causing substantial quantities of a liquid in the form of a sprayed aqueous solution to contact said gas and the step of causing substantial quantities of said solution to contact intimately said gas in said eliminator while simultaneously separating substantially all of said solution from said gas are repeated on said gas, the sprayed solution in the first treatment being different from the sprayed solution in the second treatment.

* * * * *